Jan. 16, 1962 M. R. WENTWORTH 3,016,918
SELF CONTAINED DIAPHRAGM VALVE
Filed Dec. 30, 1958 4 Sheets-Sheet 1

INVENTOR.
MILO R. WENTWORTH
BY Joseph E. Ryan
ATTORNEY

INVENTOR.
MILO R. WENTWORTH
BY Joseph E. Ryan
ATTORNEY

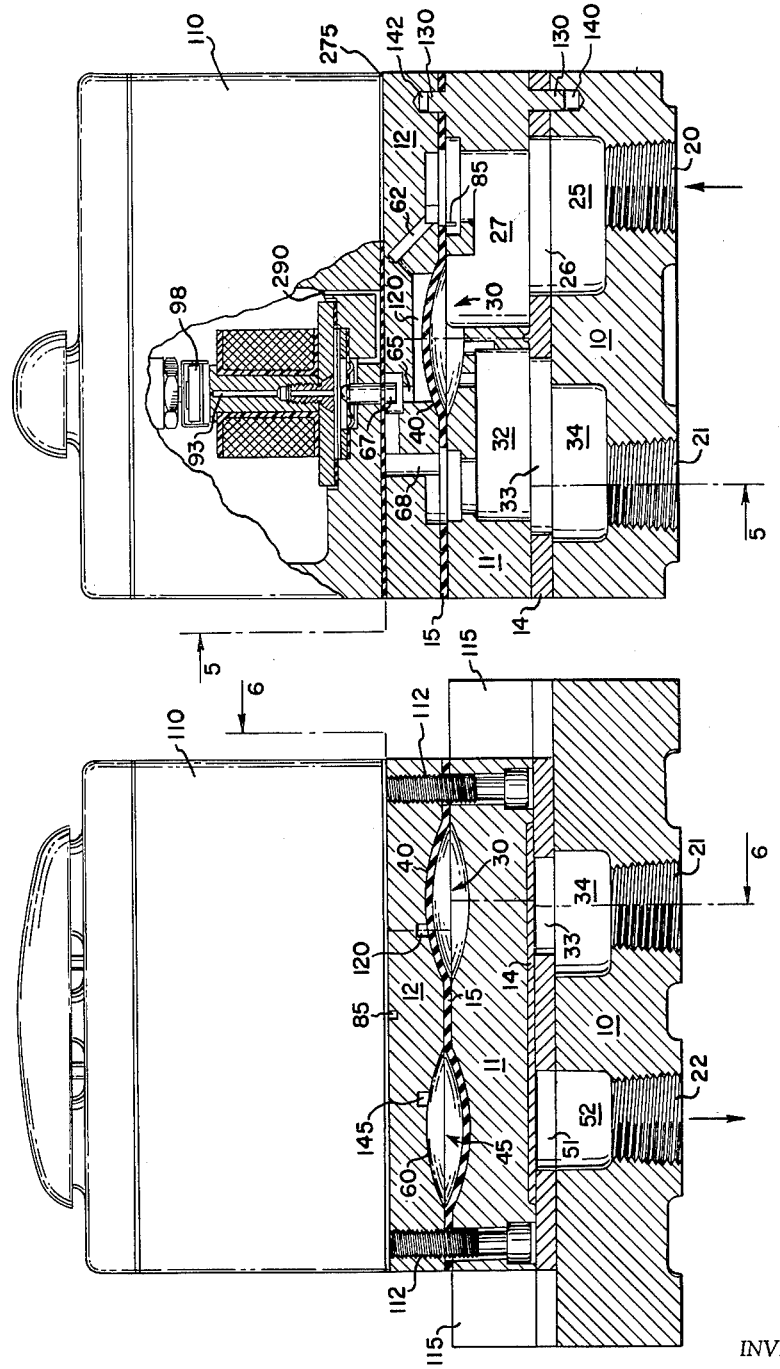

United States Patent Office 3,016,918
Patented Jan. 16, 1962

3,016,918
SELF CONTAINED DIAPHRAGM VALVE
Milo R. Wentworth, Deerfield, Ill., assignor to Minneapolis-Honeywell Regulator Company, Minneapolis, Minn., a corporation of Delaware
Filed Dec. 30, 1958, Ser. No. 783,890
9 Claims. (Cl. 137—620)

My invention relates to self contained, diaphragm operated electric pneumatic or electric hydraulic valves, more particularly to an improved valve of this type.

Figure 2:
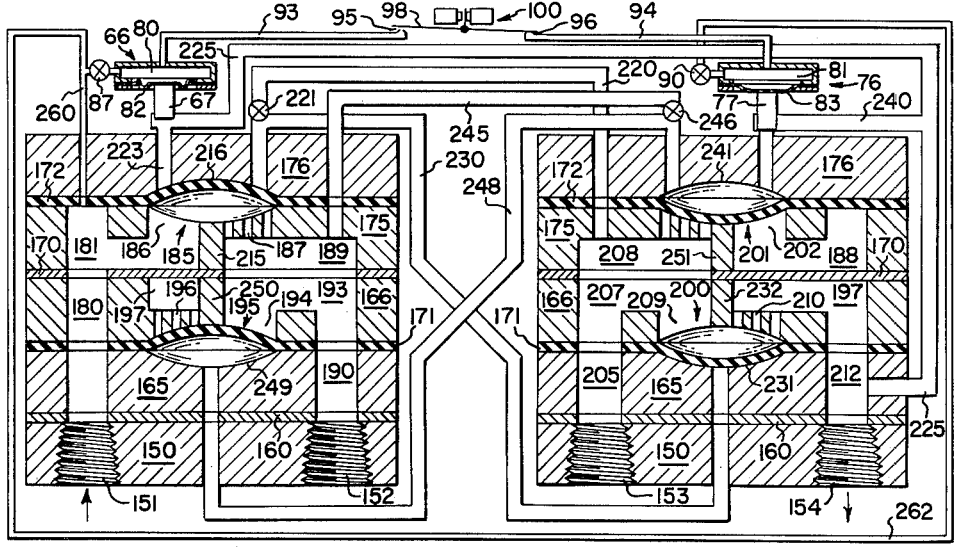
Figure 1:
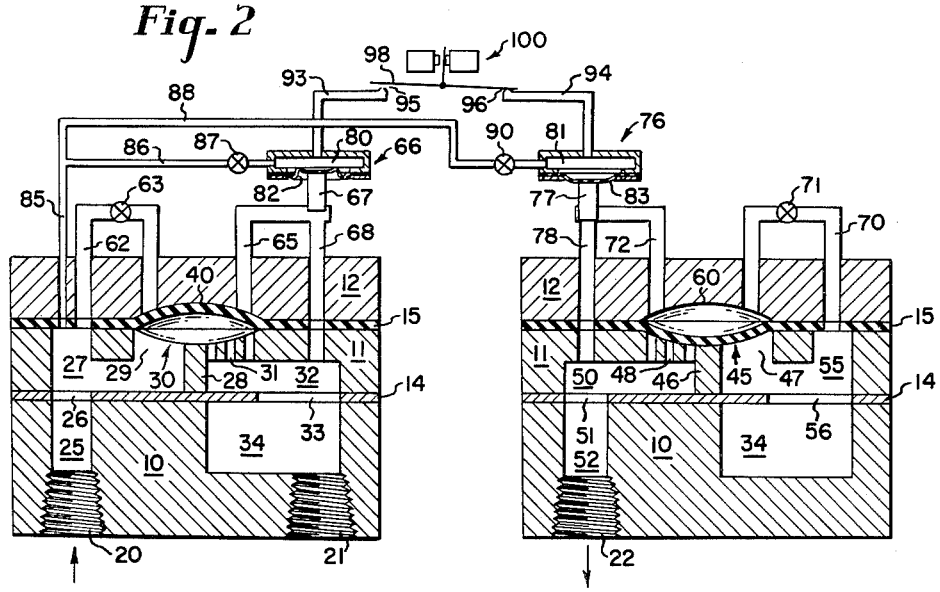
Figures 3, 4:
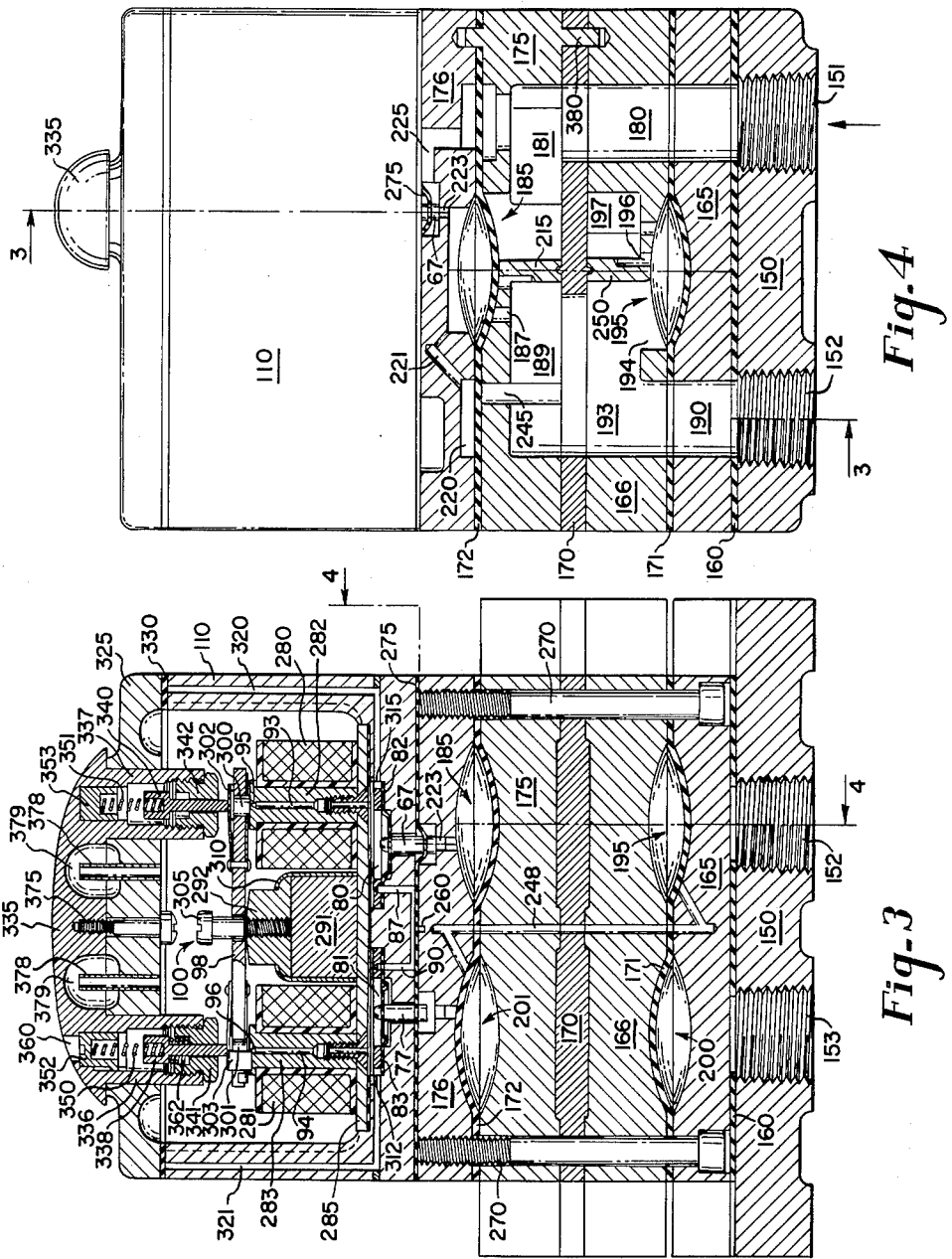
Figure 7:
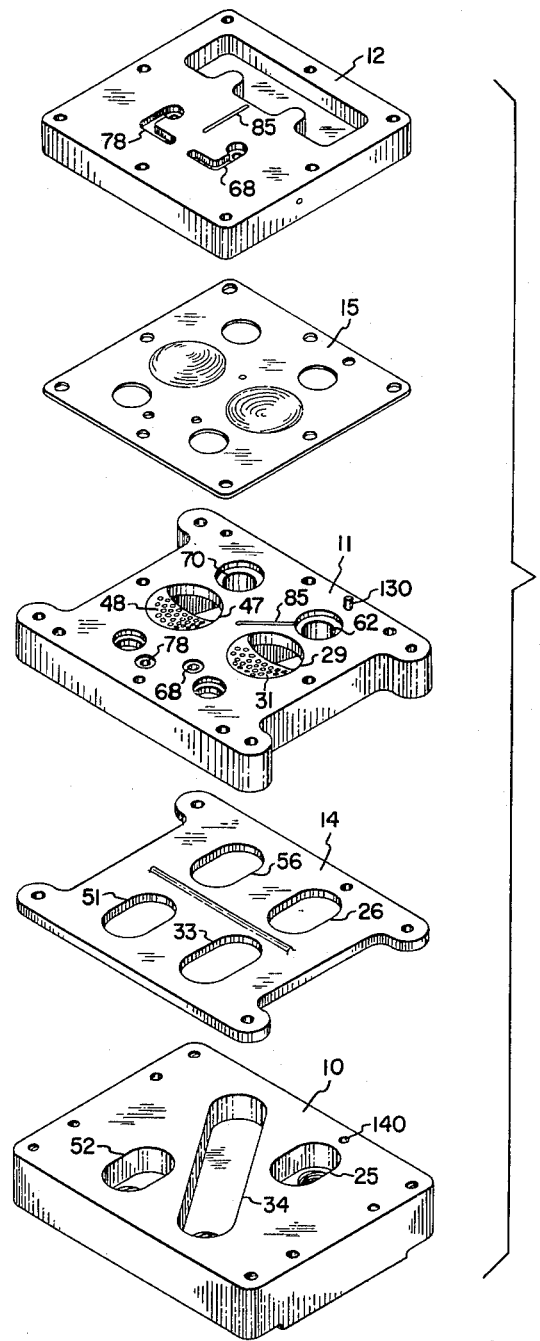

While self contained piloted diaphragm valves are well known, the novel arrangement and shape of the parts of the device disclosed herein provide a unit which is extremely rugged, simple in design and maintenance, and inexpensive to manufacture. It is therefore an object of this invention to provide an improved multiple stage piloted self-contained diaphragm valve made up of a plurality of sections or laminated type parts with porting, recesses and valve seats therein and a single diaphragm member between certain of the sections to cooperate with the recesses and seats to perform a plurality of valving functions in the formation of a multiple way valve. It is a further object of the invention to provide an improved multiple stage self contained valve made up of a plurality of similar sections with diaphragms therebetween and in which multiple valve operation may be obtained by the addition of similar sections to the valve. Another object of the invention is to provide a valve of this type which is rugged in construction, has long life, low in maintenance cost and manufacture and simple in design. A still further object of this invention is to provide in a valve of this type extremely high amplification, and simplicity for reversing the operation of the valve simply by reversing the biasing arrangement on the electromagnetic operator therein. These and other objects of the invention will become apparent from the reading of the attached description together with the drawings wherein:

FIGURES 1 and 2 are schematic and functional drawings of the improved electric pneumatic or electric hydraulic self contained diaphragm valve showing respectively three and four way versions of the same;

FIGURES 3 and 4 are front and side elevation views respectively of the four way version of this self contained piloted diaphragm valve, the FIGURE 4 being sectional generally along a line 4—4 in FIGURE 3 and FIGURE 3 being sectional along the lines 3—3 in FIGURE 4;

FIGURES 5 and 6 are similar front and side elevation views respectively of the three way vlave with the FIGURE 6 being sectioned generally along the section lines 6—6 in FIGURE 5, and FIGURE 5 being sectioned along the lines 5—5 in FIGURE 6; and FIGURE 7 is an exploded view of a portion of the three way valve with the electric pneumatic or hydraulic pilot sections removed to give a general shape and arrangement of the parts making up the main valving apparatus for the device.

The schematic or diagrammatic disclosure of FIGURE 1 shows a three way valve according to the present invention from the functional standpoint. To show the various portings, valve seats and control pilot, FIGURE 1 shows the main valve body in two parts taken as front and back sectional views of the device through the two valve seats or valving members comprising the same. The main valve structure is made up of a plurality of parts which are identified generally in FIGURE 1 and will be specifically referred to in FIGURES 5, 6 and 7 to show the exact detail of the same. In FIGURE 1 and as will be later noted in FIGURE 2 which is a diagrammatic view of the same valve in its four way version, the control piping or conduits within the main body section are shown only diagrammatically without regard to their specific arrangement within the valve body. Thus in FIGURE 1, the valve body is composed of three main sections one of which is indicated at 10 and will be hereinafter defined as a manifold section, a second identified as 11 which will be hereinafter defined as a first valve body section and the third of which identified by the numeral 12 which will be hereinafter defined as a second valve body section. Positioned between the manifold section and the valve body section identified as 11 is a spacer member indicated at 14 and between the valve body sections 11 and 12 is a single diaphragm member indicated at 15. It will be seen from this diagrammatic disclosure in which the two sections of the valve are placed side by side in the plane of the paper that the main valve body section is generally rectangular in form being made up of a plurality of parts and that it includes two valve members positioned one behind the other which as will be later noted are independent of one another. The manifold section includes three conduits or ports one designated at 20 which will be hereinafter referred to as the inlet port, the second designated at 21 which will be hereinafter designated as the cylinder port and the third designated at 22 which will be called hereinafter the exhaust port. The inlet port connects through passages 25 and 26 in the manifold and spacer members to a chamber 27 in the valve body section 11 in which is positioned a weir indicated at 28 defining with the recess an inlet portion 29 of a first valve member indicated at 30 having an outlet indicated at 31 formed with a plurality of holes leading to a recess 32 in valve body section 11 and through a passage or conduit 33 in the spacer member 14 and to a recess or chamber 34 in the manifold connected to the cylinder port 21. The valve member 30 includes in addition a portion of the diaphragm 15 positioned above the opening defined by the inlet 29, the outlet 31 and the weir section 28 therebetween which area is generally circular in form or cross section. A similar mating recessed area indicated at 40 in valve member 12 defines with that portion of the diaphragm a pressure chamber into which control air is conducted to control pressure above the diaphragm and cause the diaphragm to be urged toward the weir to close the valve member. In the second valve member indicated generally at 45 in the valve body, a similar recessed area is formed in the valve body portion 11 behind the portion defining the valve member 45 with a weir section 46 positioned between an inlet 47 and an outlet 48 having also a plurality of holes over which is positioned the second or different portion of the diaphragm 15 dividing or spacing the valve body portions or sections 11 and 12 apart. The outlet portion 48 is connected into a recess or chamber 50 in the valve body section 11 leading through passages 51 and 52 respectively in the spacer member and manifold portions 10 and 14 to the exhaust port 22. Similarly a recess or chamber 55 in the valve body section 11 connected to the inlet portion 47 of the valve 45 is connected through a port 56 in the spacer 14 to the chamber 34 which is common to and extends across the manifold section 10 at this point. The portion of the diaphragm 15 for the valve 45 defines with a second recess 60 in the valve body section 12 a pressure chamber above the diaphragm into which control air is fed to move the diaphragm against the weir and close the valve. It will be seen that the chamber 40 for valve 30 has associated therewith a conduit indicated at 62 and including a restriction 63 therein leading from the chamber or recess 27 in block 11 and being positioned generally in valve body section 12 with an additional conduit or piping 65 leading to a valve member generally indicated at 66. Valve 66 includes a plunger 67 which blocks flow therethrough with a conduit 68 leading from valve 66 through the valve body sections 11 and 12 and diaphragm 15 to the area or recess 32 common to recess 34 in the manifold section communicating with the cylinder port 21 side of the manifold 10. Similarly the valve 45 or its chamber 60 has a piping 70 with a restriction 71 therein leading from the chamber 55 and recess 34 in the valve body and manifold sections 11 and 10 respectively to the pressure chamber with a conduit or piping 72 leading to a valve indicated generally at 76. Valve 76 has a plunger 77 included therewith to control flow therethrough with a piping or conduit 78 leading from the valve and through the valve body sections 11 and 12 to the chamber 50 common to the exhaust port 22 in the manifold section 10.

The valves 66 and 76 are both piloted valves having pressure chambers 80 and 81 respectively formed by the diaphragms 82, 83 carrying the plungers 67, 77. A source of control pressure for these chambers is obtained through a conduit 85 leading to a conduit 86 having a restriction 87 therein and connected to the chamber 80 with a second conduit 88 leading from the conduit 85 and through a restriction 90 to the chamber 81. Chambers 80, 81 also include or have connected thereto conduits 93, 94 respectively which terminate in nozzles 95, 96 having cooperating therewith a pivoted flapper or armature 98 controlled by a bipole or electromagnet 100. A differential energization of the electromagnet will cause the pivoted armature 98 to pivot with respect to the nozzles 95, 96 to vary the pressure in the chambers 80, 81 differentially. This variation in pressure of the chambers will cause one or the other of the valves 66, 76 to close one of the other pilot passages to the valves 30, 45 and operate the same while the opposite valve is in an open position.

Thus it will be seen that air to be valved at the inlet port 20 will flow through the conduit 25, chamber 27 to the valve inlet 29 of valve 30. Assuming as is shown in the drawings that the electromagnet 100 is operated to increase the pressure of chamber 81 and decrease the pressure in chamber 80 to close valve 76 and open valve 66, control air from the conduits 62, 65 and 68 will be exhausted to the cylinder port 21 and the diaphragm will remain in the raised position allowing the air or hydraulic fluid, whichever is the medium to be valved, to flow across the weir and through the outlet passage 31 to the chamber and port 34, 21 respectively. Closure of the valve 76 will prevent the air which is flowing in the chamber 34 from passing through the conduits 70, 72 and 78 and will create a pressure in the chamber 60 causing the diaphragm portion to rest against the weir and closing the inlet 47 and the outlet 48 such that the exhaust port 22 is not in communication with the chamber 34. With a reversal in operation of the electromagnet, the valve 66 will be operated to close the first mentioned conduits 62, 65 and 68 increasing pressure in the chamber 40 to close valve 30 while valve 45 is opened with the opening of pilot valve 76. Thus air from the cylinder will flow from the port 21 and chamber 34 to the valve 45 and to the exhaust chamber and ports 52, 22 respectively.

Referring now to FIGURES 5, 6 and 7, the actual details of the various sections of the main valve body for this three way valve are shown in sectional drawings together with the two stage electromagnetic pilot operator. In FIGURE 5, which is basically an irregular section taken through the weir portions and the pressure chambers of the valve body sections 11 and 12 and through the exhaust and cylinder ports in the manifold section 10, it will be seen that the two valve members are positioned in a side by side relationship with a single diaphragm member 15 forming a part of each valve 30 and 45. The various parts are numbered with the same numbering as shown in the diagrammatic disclosure. The polarized operator assembly and pilot valves are mounted in a housing indicated generally at 110 and are secured through screw means indicated at 112 to the valve body sections 11 and 12. The manifold section is of slightly larger dimension and flanges indicated at 115 are included on the valve body section 11 such that these parts may be held in assembled relationship through suitable screw means (not shown).

In FIGURE 6, it will be seen that the inlet port 20 and the associated recess or chamber 25 leading through the spacer member 14 at the passage 26 communicates with the recess or chamber 27 in the valve body section 11 and the entrance of valve 30. FIGURE 6 is actually an irregular section taken along the line 6—6 of FIGURE 5 through the valve 30 to disclose the flow passages and control passages therein. It will also be seen that the inlet air through the conduit 62 from the chamber 27 will be fed to the chamber 40 above the diaphragm 15 for this valve and that a slot is milled in this chamber as indicated at 120 to permit the control air to enter the chamber when the diaphragm is resting against the recess surface of the valve body portion 12. The pressure in this chamber is controlled by the pilot valve plunger 67 which opens and closes the passage 68 back to the chamber 32 and the cylinder port 21. It will further be seen that dowel pins as indicated at 130 are included on the valve body section 11 on the upper and lower surface thereof which cooperate with guide holes 140 and 142 in the manifold 10 and the valve body portions 12 for alignment purposes. Valve 45 which is not shown in this sectional view has a flow passage with a similar supply and outlet port and pilot valving. FIGURE 5 shows a slot 145 similar to slot 120 in valve 30 in the chamber 60 for valve 45 through which air enters in the control of the position of the portion of the diaphragm for valve 45.

The details of the pilot operator are best shown in connection with the four way valve and since it is identical in the four way valve, it will be discussed in connection with this modification. The exploded view of FIGURE 7 shows the arrangement of parts with the various passages for this three way valve unit without the pilot valves and electromagnetic operator.

The four way version of the valve is illustrated diagrammatically in FIGURE 2 in the same type of drawing in which two sections are taken through the four valves of the unit and the interconnected piping between the diaphragm chambers for each valve, the pilot relays, and the electromagnetic actuator are shown for the functional explanation of the device. This unit is basically the same as the three way valve with the addition of the two additional valve plates, a slight modification in the shape of parts to provide the additional porting with the same two stages of pilot operation in the electromagnetic actuator for controlling the same. Thus as is shown in FIGURE 2, the four way valve includes a manifold section 150 having inlet port 151, a first cylinder port 152, a second cylinder port 153 and an exhaust port 154 therein. Mating apertures are included in the spacer member 160 positioned adjacent thereto upon which are positioned the valve sections 165, 166 with main flow chambers directed from the respective ports therein. The first pair of valve sections 165, 166 is divided by a spacer member 170 from a second pair of valve sections 175—176 which have a similar configuration to the sections 165, 166 and each pair include or have associated therewith diaphragms 171, 172 respectively positioned therebetween. While the valve body portions 165, 166 and 175, 176 are basically the same units, the parts are machined or ported in a slightly different manner and reverse in relation to one another to provide the main conduits to the valves from the base ports in the manifold section 150 and to provide the common chambers to be later described. It will be seen from FIGURE 2 that the inlet port 151 has a common passage through the spacer member 160, valve body sections 165, 166 together with a diaphragm 171 the spacer plate 170 to the valve body section 175 which passage is identified generally at 180 and communicates with a recess or chamber 181 in the valve body section 175 and to one of the valves 185 formed in the valve body sections 175, 176. The valve 185 has an inlet indicated at 186 and an outlet in the form of a plurality of holes indicated at 187 which communicates with a chamber or recess 189 in the valve body section 175 common to a series of porting indicated at 190 extending to the manifold section 150 and to the port 152. This common port 190 extending through these parts also communicates with a chamber 193 in the valve body section 166 in the lower half of the valve leading to an inlet 194 of a valve 195 which has an outlet indicated at 196 leading to a chamber 197 common to and adjacent a second valve 200 in the lower half of the valve structure. Similarly a chamber 188 in common with chamber 181 has an inlet 202 of a second valve 201 in common therewith in the upper half of the valve structure. Thus the passage from the inlet port 151 through the porting 180, chamber 181 to the valve 185 provides a flow to the chamber 189 and the passage 190 to the first cylinder port 152 at the time when the valve 185 is in a de-energized or open position and the valve 195 is closed. Similarly the second cylinder 153 is connected through its port and a conduit 205 in the spacer member 160, valve body sections 165, 166, diaphragm 171 to a chamber 207 in the valve body member 166 connected also with a chamber 208 in the valve body section 175. The chamber 207 is connected to an inlet 209 of the valve 200 whose outlet 210 extends to chamber 197 which in turn is connected through porting 212 in the valve body section 165, 166, the diaphragm 171 and the spacer member 160 to the exhaust port 154. With a reversal of operation of the pilot valve, to be later described, valves 185 and 200 are closed and valves 195 and 201 are open and the inlet port will be connected to cylinder port 2 while the cylinder port 1 will be connected to the exhaust port in a conventional four way type valve operation. The passage of valved medium from the inlet port 151 through the porting 180 to the chamber 181 will permit fluid flow to this point and the chamber 181 is in common with the portion of the chamber 188 leading to valve 201 of inlet 202 with fluid flow through this valve and the outlet side of the same to the chambers 208, 207 in the valve body sections 166, 175 and through the porting 205 to the outlet cylinder port 153 for cylinder 2. Cylinder 1 or its outlet port 152 is connected to the porting 190 to the chamber 193 and the inlet 194 of valve 195 with outlet 196 is common with the chamber 197. As will be noted in FIGURE 2, the fluid medium in the chamber 197 is separated by a solid portion of the spacer member 170 from the chamber 188 such that fluid flow therefrom will be directed through the porting 212 to the exhaust port 154.

Thus, it will be seen that the four way valve in its make-up and design of parts is substantially the same as that of a three way valve and that most of the parts are interchangeable with additional parts added for the four way valve. From the manifold section on up, the four way valve maintains four ports rather than three throughout all of the sections except the valve body section 176 and the individual chambers which are common to one another are connected by means of overlying chambers and ports in the sections and spacer member 170. The control, that is the pilot stages for this four way valve unit is identical to that of a three way unit except that slightly different porting arrangements are utilized for the control of the four valve members in place of the two valve members used in the three way valve unit. Further distinction is noted in connection with the four way valve unit in that the pressure supplies for operating on the diaphragms or in the chambers for the respective valves are taken from the outlet sides of each of the top valve units as distinguished from the inlet side of the valve in the three way valve unit. This change will be seen by comparison of FIGURES 3 and 4 with FIGURES 5 and 6 and is effected by mere reversal of the top plate or valve body section. Thus valve 185 which is defined by recesses in the plates 175, 176 and a portion of the diaphragm 172 cooperating with a weir section 215 in the valve body section 175 and a recess or chamber 216 in the valve body section 176 receives its pilot supply from the chamber 208 common to the output port or second cylinder port 153 through a conduit 220 (FIGURE 4) having a restriction 221 therein leading to the chamber or recess 216. A second conduit 223 includes the valve member 66 or the plunger 67 thereof in the conduit to control the flow therethrough with the outlet from the valve being connected to the conduit 225 to the porting 212 common with the exhaust port 154 (not shown in FIGURES 3 and 4). A second conduit or piping 230 is connected in common with the conduit 220 beyond the restriction 221 and supplies pressure to the chamber or recess 231 for the valve member 200 in which a portion of the diaphragm 171 cooperates with a weir section 232 in valve body section 166 to make up the parts of the valve 200. Thus operation of the valve 66 will effect a change in pressure in both the chambers 216 and 231 to operate these valves simultaneously and when closed or when the plunger seals the conduit 223 a pressure will build up behind the respective diaphragm portions to operate the valves 185 and 200. With the opening of the valve 66, the control air flow through the conduit 220 will be such that no pressure build-up will occur in the chambers 185, 200 and the control air will be dumped through the conduit 225 to the exhaust port 154. Similarly the valves 201 and 195 are operated from or controlled by the pilot valve 76 whose plunger 77 is included in a conduit 240 leading to the chamber or recess 241 in a valve body portion 176 common to a portion of the diaphragm 172 for defining valve 201. The conduit 240 is connected in common with a conduit 225 and exhausting to the exhaust port 154. Control air is supplied to this chamber from a conduit 245 common with the recess 189 in valve body portion 175 downstream of the valve 185, the conduit including a restriction 246 and extending into the chamber 241 in the same manner as a three-way valve. This conduit beyond the restriction has a second conduit 248 which leads to the chamber or recess 249 in the valve body portion 165 which cooperates with the portion of the diaphragm 171 and a weir section 250 in valve body portion 166 to define the valve 195. Thus a pilot valve 76 will control valved fluid pressure to the chambers 249 and 241 to operate the diaphragms toward and away from the respective weir sections 250 and 251 for the valves 195 and 201. When valve 76 is open, the control air in the conduit 245 will be bled through the conduit 225 to the exhaust port 154.

The pilot valves 66 and 76 in turn receive their control air pressure from the conduit or piping 260 common to the inlet port 151 to the chamber 181 in valve body section 175 which as in the case of the three way valve is connected through the restriction 87 to the diaphragm chamber 80 of valve 66 whose diaphragm 82 carries the plunger 67. The conduit 260 also extends through a conduit 262 similar to conduit 88 in FIGURE 1 and through a restriction 90 for the chamber 81 of valve 76 whose diaphragm 83 carries the plunger 77 for the valve 76. Each of the chambers 80, 81 are again connected through the lead conduits 93, 94 respectively to the nozzles, 95, 96 where the pivoted lever 98 of the relay 100 cooperates with the nozzles to vary differentially the pressures of the chambers 80, 81.

Thus in this diagrammatic showing, when the armature or lever 98 is pivoted toward the nozzle 96 a build up of pressure will be experienced in the chamber 81 of valve 76 causing the plunger 77 to close the ports for valves 201 and 195 to close flow therethrough. With this position of the flapper 98 or armature the valve 66 will be open and the plunger 67 withdrawn to permit flow from pilot conduit 220 such that the valves 185 and 200 will be open connecting the inlet port 151 to the cylinder port 152 and the second cylinder port 153 to the exhaust port 154. The reversal in the operation or energization of the electromagnet 100 will close these last named valves and open valves 195, 201 in a conventional manner.

It should be recognized that the disclosures of FIGURE 1 and FIGURE 2 are diagrammatic only and that the arrangement of the porting to the valves and the control piping for operation of the same do not lie in the same plane such that ideal sections may be taken of the same. To correlate the arrangement of the ports in FIGURE 2 with those in the formal drawings in FIGURES 3 and 4, it should be considered that the sections in FIGURE 2 would be taken with respect to the sectional drawing in FIGURE 4 such that the sections are taken in the plane of the section of FIGURE 4 but one section is rotated 180° and the piping interconnected for diagrammatic purposes. It should also be recognized that in connection with FIGURES 3 and 4, which is the actual disclosure of the valve structure, that the sections therein are irregular and substantially along the lines indicated in the figures. Thus in FIGURES 3 and 4 it will be seen that the manifold section 150 will have its ports positioned therein offset from the centers of the respective valves and that the valve body sections 165, 166, 175, 176 together with the diaphragms 171, 172 and the spacer member 170 are all held together by suitable means such as screws indicated at 270 which secure to the casing 110 of the relay and the electromagnet section. Further the valve body sections 165, 166 and 175 together with the spacer 170 have extending flanges which meets with the overlapped or extended portions of the manifold section 150 which in turn are secured together through suitable means such as screws (not shown). In FIGURE 3, the porting 248 connecting the valve 201 and the valve 195 and associated with the conduit 245 (not shown) is shown in the section with this portion of the section being slightly offset in the center of the valves. A similar conduit 230 is provided and is located behind the conduit 248 such as not to appear in FIGURE 3. FIGURE 3 also shows the details of the pilot valves 66 and 76 with the plungers of the same being attached to and sealed from the main portion of these pilot valves by means of a diaphragm 275 which is positioned between the valve body section 176 and the base portion of the relay actuator casing 110. As will be later noted the chamber formed between the diaphragm 275 and the individual diaphragms for the relays is vented to atmosphere such as appears at 290 in FIGURE 6 for this sectional portion of the actuator. Actuator 100 as shown in section in FIGURE 3 and a part in section in FIGURE 6 includes two electromagnetic coils 280, 281 mounted on core members 282 and 283 through which extend the passages or piping 93 and 94 respectively terminating in the nozzles 95, 96. The armature member 98 for the electromagnet carries the actual valve closure members 300 and 301 at the extremities thereof which cooperate with the nozzles 95, 96 to vary the pressures for the pilot relays. The armature is secured to the pole member 292 through suitable screw means 305 and a permanent magnet 291 is held in position on the base plate of the relay 285 through suitable clip 310. This base plate 285 is suitably secured to the base or cover section 110 of the relay and recesses 312, 315 therein define with the diaphragms 82, 83 the pilot chambers for the valves 76 and 66 into which are connected the pipings and restrictions 90 and 87 leading to the inlet side of the valve. It will be noted in FIGURE 3 that the chambers for the valves 67 and 77 are also connected through passages 320, 321 up the sides of the casing 110 to the cover section 325 of the actuator with suitable sealing means 330 sealing these passages except under conditions when this cover portion is removed such that the pilot chambers will be bled to make the valve inoperative. Cover section 325 is designed to be suitably secured to the casing 110 through means such as screws (not shown).

Included in the cover section 325 are the biasing springs for the electromagnet which are mounted in a handle-like member or raised portion 335 having two extensions 336, 337 which extend through apertures in the casing and mount the spring thrust members 338, 340 respectively. The projections 337 and 336 each have tapped apertures therein into which the guide nuts 341, 342 are positioned. Slidedly mounted in the guide nuts are the spring biasing thrust members 338, 340 which position one end of the bias spring 350, 351 respectively in projections with the other ends of the springs being held by retainer caps 352, 353 respectively. The cap 352 is threaded or similarly secured in this design to be positioned through a suitable tool receiving means 360 in the handle member 335 to vary the position of the spring and hence the force on the thrust member or finger 338. This finger acts against the spring clip 303 on the armature to bias the same. A return spring 362 is positioned between the member 338 and the nuts 341 for balancing purposes. The cap 353 is fixed to the handle-like mounting portion 335 and its associated thrust member 340 rests against the clip 302 on the opposite end of the armature 98 cooperating with a nozzle 95. This handle-like portion or spring maintainer is suitably secured to the cap 325 by means of a screw 375. By releasing this screw and removing the member 335 with the springs secured thereto and reversing their position with respect to the armature, the device may be made reverse acting. The chamber within the casing 110 and in which the electromagnetic actuator is mounted is vented to atmosphere through the member 335 by means of tubes 378 which extend into recesses 379 therein with these recesses extending to the atmosphere. With this type of venting, the interior of the pilot relay is allowed to breathe or release the air bled from the nozzle and yet the nozzles are substantially protected from dirt or dust.

It will be seen that the operation of this device is identical with the operation of the three way valve, and that the electromagnetic pilot section with this self contained diaphragm valve which includes two stages of amplification is identical for both valve versions. Similarly it will be seen that the basic valve elements making up the three or four way versions of the valve are substantially identical except for special machining in the four way version, to provide a simplified design which is rugged in construction, simple in maintenance and economical to manufacture. It will be further recognized that in connection with the four way valve, all of the porting is not shown in FIGURES 3 and 4 of the formal drawings, but it will be understood that as in the diagrammatic disclosure on the downstream side of each of the valves 185 and 201 as was described for the valve 185 in FIGURE 4 a passage connects the chamber 189 with the operating chamber of the pilot valve with the relay means 66 and 76 positioned therein to bleed the valve or control the pressure therein and connect or exhaust the chambers behind pilot diaphragms to the exhaust side of the valve through a conduit not shown since the exhaust port is not shown in these sections. Similarly the passage for the control air to the pilots 76, 66 and the nozzles 95, 96 are connected through conduits not shown in FIGURE 4. In the four way valve as in the three way valve guide pins are included in one or the other of the valve body sections such as is shown at 380 in FIGURE 4 to align the parts.

In considering this invention it should be remembered that the present invention is illustrative only and we wish to be limited only by the appended claims.

What is claimed is:

1. A self contained multiple stage pneumatic valve comprising, a manifold section with inlet, outlet and exhaust passages therein, a pair of valve body sections having passages therein which align with the inlet, outlet and the exhaust passages of said manifold section positioned adjacent thereto, said valve body sections forming at least a pair of valve means therebetween with one section having a valve seat and conduits leading to said passages, recesses in the other of said valve body sections, a single diaphragm means positioned between the pair of valve body sections and overlying the recesses to define therewith pressure chambers for the valve means and cooperating with the seats to control fluid flow through said passages in said valve body sections, pilot valve means adapted to receive through conduit means fluid from said passages in said valve body sections and operative to control the pressure in said pressure chambers to operate said valve means selectively, and electromagnetic actuator means included with and controlling the operation of said pilot valve means.

2. A self contained four-way diaphragm valve comprising, a manifold section with inlet, outlet and exhaust passages therein, two pair of valve body sections each having passages therein which align with the inlet, outlet and the exhaust passages of said manifold section positioned adjacent thereto, each pair of said valve body sections forming at least a pair of valve means therebetween, one of said valve body sections of each pair having valve seats with conduits leading to said passages therein, recesses in each of the other of said pair of said valve body sections, a single diaphragm means positioned between each of the pairs of said valve body sections and overlying the recesses to define therewith pressure chambers and cooperating with the valve seats to control fluid flow through said passages in said valve body section, pilot valve means adapted to receive through conduit means fluid from said passages and operative to control the pressure in said pressure chambers to operate said valve means selectively, and an electromagnetic actuator means included with and controlling the operation of said pilot valve means.

3. A self contained multiple stage pneumatic valve comprising, a manifold section with inlet, outlet and exhaust passages therein, a pair of valve body sections having passages therein which align with the inlet, outlet and the exhaust passages of said manifold section positioned adjacent thereto, said valve body sections forming at least a pair of valve means therebetween, one of said valve body sections having valve seats with conduits leading to passages therein, recesses in the other of said valve body sections, a single diaphragm means positioned between the pair of valve body sections and overlying the recesses defining therewith pressure chambers and cooperating with the valve seats to control the flow of a fluid through said passages with variation in pressure in said pressure chambers, pilot valve means adapted to receive through conduit means in said valve body sections fluid from said passages and operative to control the pressures in said pressure chambers to operate said valve means selectively, and screw means holding said manifold, said valve body sections and said pilot valve means in assembled relationship.

4. A self contained multiple stage pneumatic valve comprising, a manifold section with inlet, outlet and exhaust passages therein, a pair of valve body sections having passages therein which align with the inlet, outlet and exhaust passages of said manifold section positioned adjacent thereto, said valve body sections forming at least a pair of valve means therebetween, one of said valve body sections having valve seats and conduits leading to said passages in said one valve body section, recesses in the other of said valve body sections, a single diaphragm means positioned between the pair of valve body sections and overlying the recesses to define therewith pressure chambers for said valve means and cooperating with said valve seats to control flow of a fluid through said passages in said valve body sections, a two-stage pilot valve means adapted to receive through conduit means fluid from said passages and operative to control pressures in said pressure chambers to operate said valve means selectively, a polarized electromagnetic actuator adapted to be selectively energized and operated between two positions, nozzle valve means included in the first stage of said two-stage pilot valve means and connected to said electromagnetic actuator to be operated thereby to operate the second stage of said pilot valve means, and means holding said pilot valve means, said actuator, said valve body sections and said manifold section of the assembled relationship.

5. A self contained multiple stage pneumatic valve comprising, a manifold section with inlet, outlet and exhaust passages therein, a pair of valve body sections having passages therein which align with the inlet, outlet and exhaust passages of said manifold section positioned adjacent thereto, said valve body sections forming at least a pair of valve means therebetween, one of said valve body sections having valve seats and conduits leading to said passages in said one valve body section, recesses in the other of said valve body sections, a single diaphragm means positioned between the pair of valve body sections and overlying the recesses to define therewith pressure chambers for said valve means and cooperating with the valve seats to control the flow of a fluid through said passages in said valve body sections, a two-stage pilot valve means adapted to receive fluid from said passages and operative to control pressures in said pressure chambers to operate said valve means selectively, a polarized electromagnetic actuator adapted to be selectively energized and operate between two positions, nozzle valve means included in the first stage of said two-stage pilot valve means and operated by said electromagnetic actuator to vary the pressures at said nozzle valve means and operate said pilot valve means, means holding said pilot valve means, said actuator and said valve body and said manifold sections in assembled relationship, conduit means connected from the outlet and exhaust passages to said pilot valve means and said pressure chambers of said valve means in said valve body sections for varying pressures for operation of said valve means, and further conduit means connected from the inlet passage to said first stage of said pilot valve means.

6. A self contained multiple stage pneumatic valve comprising, a manifold section with inlet, outlet and exhaust passages therein, a pair of valve body sections having passages therein which align with the inlet, outlet and exhaust passages of said manifold section positioned adjacent thereto, said valve body sections forming at least a pair of valve means therebetween, one of said valve body sections having valve seats and conduits leading to said passages in said one valve body section, recesses in the other of said valve body sections, a single diaphragm means positioned between the pair of valve body sections and overlying the recesses to define therewith pressure chambers for said valve means and cooperating with said valve seats to control flow of a fluid through said passages in said valve body sections, a two-stage pilot valve means adapted to receive through conduit means fluid from said passages and operative to control pressures in said pressure chambers to operate said valve means selectively, a polarized electromagnetic actuator adapted to be selectively energized and operated between two positions, nozzle valve means included in the first stage of said two-stage pilot valve means and connected to said electromagnetic actuator to be operated thereby to operate the second stage of said pilot valve means, means holding said pilot valve means, said actuator, said valve body sections and said manifold section of the assembled relationship, and reversible spring means included with said electromagnetic actuator and adapted to reversibly bias said electromagnetic actuator and reverse the operation of said pneumatic valve.

7. A self contained multiple stage pneumatic valve comprising, a manifold section with inlet, outlet and exhaust passages therein, a pair of valve body sections having passages therein which align with the inlet, outlet and the exhaust passages of said manifold section positioned adjacent thereto, said valve body sections having at least a pair of valve means formed therebetween, one of said valve body sections having valve seats with conduits leading to said passages in said one valve body section, recesses in the other of said valve body sections, a single diaphragm means positioned between the pair of valve body sections and overlying the recesses to define therewith pressure chambers and cooperating with the valve seats to control fluid flow through the passages in said valve body sections, a two-stage pilot valve means adapted to receive through conduit means fluid from passages in said valve body sections and operative to control pressures in said pressure chambers to operate said valve means selectively, a polarized electromagnetic actuator having an armature and coils, said actuator adapted to be selectively energized by a control circuit and to operate between two positions, nozzle means included in the first stage of said two-stage pilot valve means and cooperating with the armature positioned through the coils of said actuator to vary the pressures at said nozzles and thereby operate the second stage of said two-stage pilot valve means, means holding said pilot valve means, actuator, and valve body and manifold sections in assembled relationship, and cover means enclosing said pilot valve means and said actuator and including said conduit means to said pilot valve means such that said conduit means are broken when said cover means is removed.

8. A self contained multiple stage pneumatic valve comprising, a manifold section with inlet, outlet and exhaust passages therein, a pair of valve body sections having passages therein which align with the inlet, outlet and exhaust passages of said manifold sections positioned adjacent thereto, said valve body sections having at least a pair of valve means formed therebetween, one of said valve body sections having valve seats with conduits leading to said passages in said one valve body section, recesses in the other of said valve body sections, a single diaphragm means positioned between the pair of valve body sections and overlying the recesses to define therewith pressure chambers and cooperating with the valve seats to control fluid flow through the passages in said valve body sections, said valve seats being formed with a plurality of apertures extending to the outlet side of said valve means and being adapted to be covered by said diaphragm means for operation of said valve means, pilot valve means adapted to receive through conduit means fluid from said passages and operative to control the pressures in said pressure chambers to operate said valve means selectively, and screw means holding said manifold, said valve body sections and said pilot valve means in assembled relationship.

9. A self contained multiple stage pneumatic valve comprising, a manifold section with inlet, outlet and exhaust passages therein, a pair of valve body sections having passages therein which align with the inlet, outlet and exhaust passages of said manifold sections positioned adjacent thereto, said valve body sections forming at least a pair of valve means therebetween, one of said valve body sections having valve seats and conduits leading to said passages, recesses in the other of said valve body sections, a single diaphragm means positioned between the pair of valve body sections and overlying the recesses to define therewith pressure chambers for said valve means and cooperating with the valve seats to control fluid flow through said passages, pilot valve means adapted to receive fluid pressure from said passages and operative to control the pressure in said pressure chambers to operate said valve means selectively, conduit means in said valve body sections connecting said passages and said pressure chambers to said pilot valve means, an electromagnetic actuator included with and controlling the operation of said pilot valve means, and sealing means positioned between said sections with at least one of said sealing means being said diaphragm means.

References Cited in the file of this patent

UNITED STATES PATENTS

| | | |
|---|---|---|
| 2,376,918 | Hughes | May 29, 1945 |
| 2,412,490 | Biggle | Dec. 10, 1946 |
| 2,460,908 | Scott | Feb. 8, 1949 |
| 2,569,881 | Davies | Oct. 2, 1951 |
| 2,617,444 | Gardner | Nov. 11, 1952 |
| 2,861,550 | Hanna et al. | Nov. 25, 1958 |
| 2,881,801 | McCormick | Apr. 4, 1959 |